United States Patent [19]

Coller

[11] 3,789,481

[45] Feb. 5, 1974

[54] MECHANICAL ANALOGUE COMPUTER AND WIRING MACHINE

[76] Inventor: James Ray Coller, Mechanicsburg, Pa.

[22] Filed: May 24, 1972

[21] Appl. No.: 256,519

[52] U.S. Cl. ......... 29/203 P, 29/203 B, 29/203 MW

[51] Int. Cl. ......... H05k 13/04

[58] Field of Search...29/203 P, 203 B, 203 MW, 29/203 R, 203 D, 208 C, 200 P

[56] References Cited

UNITED STATES PATENTS

| | | | |
|---|---|---|---|
| 3,231,967 | 2/1966 | Kreinberg et al. | 29/203 B |
| 3,360,808 | 1/1968 | Taysom | 81/9.5 A X |

*Primary Examiner*—Thomas H. Eager
*Attorney, Agent, or Firm*—Gerald K. Kita, Esq.

[57] ABSTRACT

A wiring machine for bridging a discrete length of electrical wire between selected point-to-point locations of a printed circuit board and a mechanical analogue computer used to compute the length of wire required to bridge between the point-to-point locations. The machine includes a table which carries the printed circuit board for displacement along each of two orthogonal axes. The computer is responsive to displacement of the table and includes a system of gear trains for driving a wire feeding mechanism to feed a discrete length of wire corresponding to the length of table displacement along either of said orthogonal axes. When said table is diagonally displaced with respect to the orthogonal axes, the computer will drive the wire feeding mchanism to provide a length of wire equivalent to the length of such diagonal displacement, thereby providing discrete point-to-point wiring on the printed circuit board.

7 Claims, 7 Drawing Figures

MECHANICAL ANALOGUE COMPUTER AND WIRING MACHINE

The present invention relates generally to point-to-point wiring apparatus for connecting a discrete length of electrical wire between a pair of spaced locations defined on a substrate such as a printed circuit board. More particularly, the present invention relates to a computer for determining the corresponding discrete length of electrical wire necessary to bridge between a selected pair of spaced locations of the substrate. A salient feature of the present invention is that the computer is entirely mechanical in operation to drive directly a wire feeding mechanism which supplies the computed discrete length of wire necessary for bridging between the selected locations of the substrate.

The present invention is further directed to a point-to-point wiring machine utilizing the mechanical analogue computer. In summary, the machine includes a table upon which a printed circuit board or other suitable substrate is affixed. The table is mounted for linear displacement along each of two orthogonal axes. The table may also be displaced diagonally with respect to both axes. The machine further includes a suitable conventional wire connecting mechanism and a wire feeding mechanism for supplying a discrete length of electrical wire to the wire connecting mechanism. The mechanical analogue computer according to the present invention is operatively coupled between the displaceable table and the wire feeding mechanism. In operation, a first location or connection point of the substrate is located adjacent the wire connecting mechanism. The mechanism is actuated in the conventional manner to connect one end of the discrete length of electrical wire to the desired location of the substrate. The table is then displaced to position a second location or connection point adjacent the wire connecting mechanism. The computer includes a system of gear trains for converting displacement of the table to a mechanical signal used to drive the wire feeding mechanism which supplies to the wire connecting mechanism a discrete wire length substantially equal to the length of the table displacement. The wire connecting mechanism is then actuated in the conventional manner, first utilizing a cutter to cut the discrete length of wire from the continuous length and then to connect the end of the discrete length of wire at the second location on the substrate. When the table is displaced diagonally with respect to the orthogonal axes, the computer will drive the wire feeding mechanism to feed a discrete length of wire equal to the length of diagonal displacement of the table. The system of gear trains in the computer is coupled directly between the table and the wire feeding mechanism, resulting in a purely mechanical system of determining and supplying the required discrete length of electrical wire. The computer according to the present invention thus eliminates the need for an electrical system for converting the table displacement to an equivalent electrical signal, which then must be translated into mechanical production of the required length of wire.

In a preferred embodiment of the present invention the table is displaced by either clockwise or counterclockwise angular displacement of a pair of elongated worm gears defining the orthogonal axes for table displacement. The computer gear train system senses both clockwise and counterclockwise displacement of the worm gears and mechanically converts such displacements to a unidirectional mechanical output which drives the wire feeding mechanism in order that a desired discrete length of wire is supplied to the wire connecting mechanism as described.

It is therefore an object of the present invention to provide a mechanical analogue computer for determining the required length of wire necessary for bridging between selected spaced locations of a substrate.

Another object of the present invention is to provide a mechanical analogue computer for sensing either clockwise and counterclockwise displacement of a pair of shafts and for converting such displacements into a corresponding unidirectional angular displacement.

Another object of the present invention is to provide a point-to-point wiring machine utilizing a wire connecting mechanism for bridging discrete lengths of wire between spaced locations of a substrate, a wire feeding mechanism for supplying discrete lengths of wire to the wire connecting mechanism, a table for carrying the substrate to which discrete lengths of wire are to be connected, said table being programmed for displacement in order to sequentially position selected spaced locations of said substrate adjacent to said wire connecting mechanism, and a mechanical analogue computer for sensing either axial or diagonal displacement of the table and for driving said wire feeding mechanism in order to supply to said wire connecting mechanism a discrete length of wire corresponding to the length of displacement of said table.

Another object of the present invention is to provide a point-to-point wiring machine utilizing a table, which carries a substrate thereon and which is sequentially repeatedly indexed to locate a plurality of selected locations of said substrate adjacent to a wire connecting mechanism, together with a wire feeding mechanism, which is directly coupled mechanically to the wire connecting mechanism and the table in order to supply discrete lengths of wire sufficient to bridge between said selected locations of said substrate and allow connection of said discrete lengths of wire to said substrate by said wire connecting mechanism.

Other objects and many attendant advantages of the present invention will become apparent upon perusal of the following detailed description taken in conjunction with the accompanying drawings, wherein.

Figure 1:
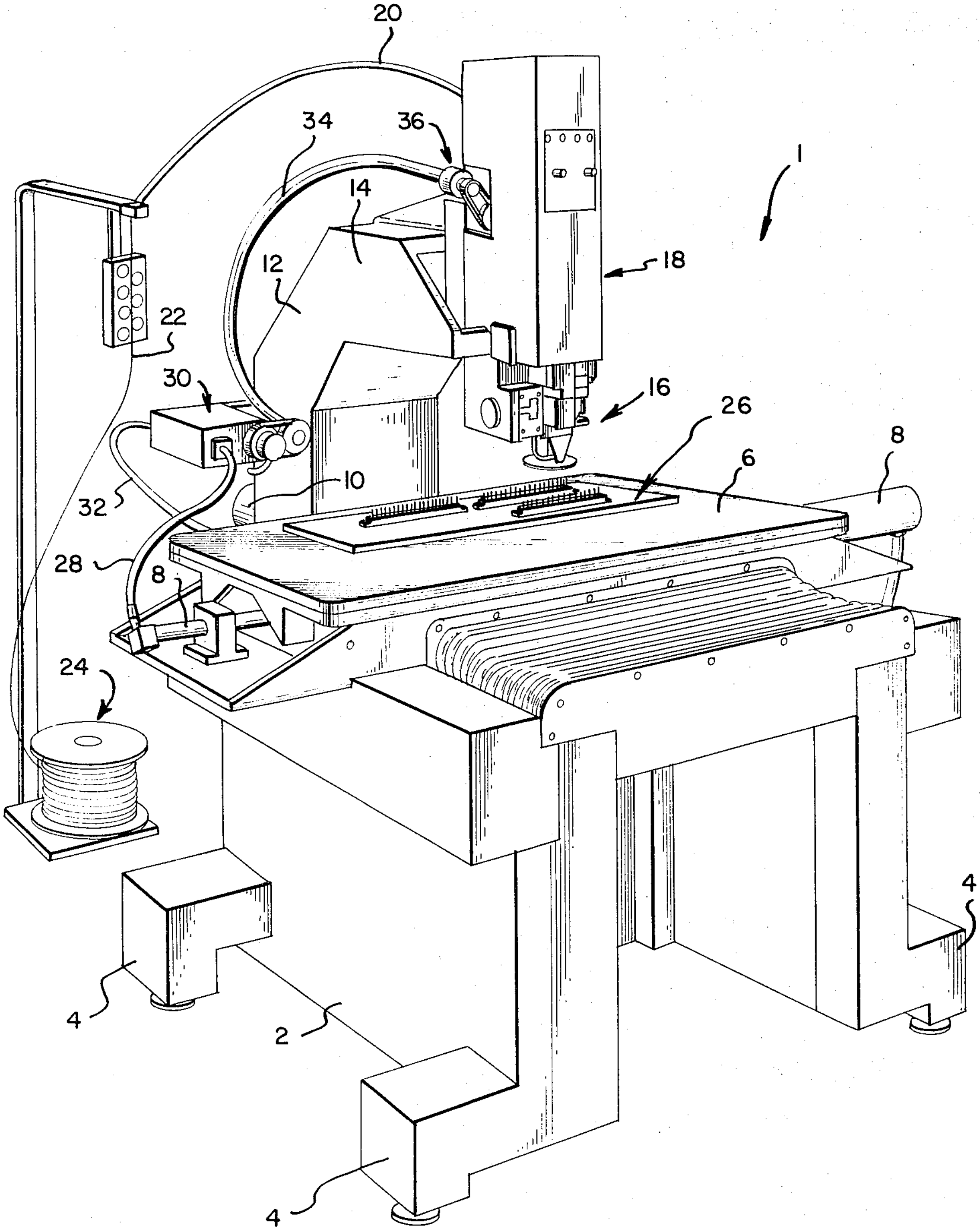
FIG. 1 is a perspective of a point-to-point wiring machine according to the present invention.

With more particular reference to the drawings, there is illustrated in FIG. 1, generally at 1 a point-to-point wiring machine according to a preferred embodiment of the present invention. The machine includes a base 2 supported by a plurality of legs some of which are illustrated at 4. The base 2 includes a generally horizontal table 6 mounted for displacement either along or diagonally with respect to a pair of orthogonal axes. More specifically, the table 6 is operatively coupled to a pair of elongated drive shafts partially illustrated at 8 and 10, which are located perpendicular to each other and along the orthogonal axes of displacement. The shafts 8 and 10 may comprise elongated worm gears, the table undersurface being provided with mating racks (not shown) driven upon angular displacement of the shafts 8 and 10. For example, such a table 6 and driving shafts 8 and 10 are conventional. For example, they are commercially available from the Superior Electric Company. A preferred embodiment of the table utilized in the present invention is model number SNC 400D No. 82. Such a table includes a numerical control input, model number NC-IR-4T, which may be utilized to repeatedly displace the table to selected sequential locations referenced to an orthogonal coordinate system having axes represented by the shafts 8 and 10.

The machine 1 further includes a vertically projecting arm 12 mounted on the base 2. The arm has a portion 14 which vertically overlies the table 2 and is disposed in spaced relationship from the table. The arm portion 14 has depending therefrom a conventional wire connecting mechanism generally illustrated at 16. The wire connecting mechanism 16 is operatively connected to a wire feeding mechanism generally illustrated at 18. As shown in FIG. 1, the wire feeding mechanism includes an inlet tube 20 through which is threaded a continuous length of wire 22 which is continuously supplied to the wire feeding mechanism 18 from a wire supply source 24, for example, in the form of a spool upon which the continuous length of wire 22 is reeled.

What has been described thus far are the component parts of a point-to-point wiring machine. In the operation of such a machine, the table 6 has attached thereon a substrate generally illustrated at 26. The table 6 is sequentially displaced in order to sequentially locate a plurality of selected locations of the substrate 26 vertically under the wire connecting mechanism 16. The wire connecting mechanism is itself actuated first to cut discrete lengths of electrical wire and then to connect the ends of the discrete lengths of electrical wire at each sequentially positioned location of the substrate 26. The wire feeding mechanism 18 is itself repeatedly actuated to supply serially uncut discrete lengths of wire to the wire connecting mechanism, the discrete wire lengths being of sufficient lengths to bridge between selected locations of the substrate 26.

The substrate 26 may be either of two types. In a first type, the substrate is provided thereon with a plurality of upstanding electrically conducting post-type contacts or terminals located on precisely spaced centers. Such a substrate well known in the prior art is readily adapted for electrical connection thereto of discrete wire lengths by either a wire wrapping connection or a clip-type connection. Both wire wrapping and clip-type electrical connections are well known in the prior art. For example, the latter type of connection is disclosed in U.S. Pat. No. 3,243,754. Prior art point-to-point wiring machines for making clip-type electrical connections include U.S. Pat. Nos. 3,186,077; 3,231,967; 3,239,918 and 3,372,475. A machine suitable for making a wire wrapping connection is disclosed in U.S. Pat. No. 3,360,808. Each of the prior art machines thus fully discloses a wire connecting mechanism suitable for connecting discrete wire lengths at locations on a substrate, which locations are defined by post-type terminals. Thus, in the present invention, the wire connecting mechanism 16 may be of any conventional type well known and fully disclosed in the prior art.

In the alternative, the substrate may be of the type having a plurality of spaced apertures which define the selected point-to-point locations at which discrete lengths of wires are to be connected. Such a substrate is fully disclosed in U.S. Pat. application Ser. No. 152,140, filed June 11, 1971, now abandoned. In a substrate of this type, discrete lengths of wires are connected at the desired locations merely by insertion into the apertures. The machine 1 according to the present invention thus may be utilized to connect discrete lengths of wires to selected locations of a substrate merely upon inserting the ends of each discrete length of wire into corresponding apertures defining the selected locations of the substrate. For a substrate of this type, the wire connecting mechanism 16 may be in the form of a conventional sewing machine mechanism which is desirably actuated to connect discrete wire lengths between the spaced locations of the substrate without necessarily making an electrical connection, as is conventional with the operation of a conventional sewing machine.

One of the problems associated with the operation of a point-to-point wiring machine is the necessity for sequentially supplying varying discrete lengths of wires to the wire connecting mechanism. This requirement is necessitated because varying lengths of wires are needed for bridging between and connection to selective substrate locations having different spacings therebetween. The practice of purposely providing wire lengths which are excessively long increases costs and greatly adds to the weight and bulk of the interconnected wires, a feature which is undesirable when there are weight and available space limitations.

U.S. Pat. No. 3,231,967 is an exemplary prior art directed toward a mechanism for determining required discrete wire lengths and for serially supplying the same to a wire connecting mechanism. Heretofore the required discrete lengths of wire are identified by corresponding electrical signals which were then translated into a corresponding controlled mechanical movement of the wire feeding mechanism.

The present invention relates to an improvement of a prior art point-to-point wiring machine in that the wire feeding mechanism 18 is mechanically coupled to the table 6 in order that any displacement of the table is transmitted directly to driving the wire feeding mechanism in order to supply a corresponding discrete length of wire equal to the length of table displacement. Thus as shown in FIG. 1, the table drive shaft 8 is directly coupled mechanically through a flexible rotatable shaft 28 to a mechanical analogue computer 30 according to the present invention. In similar fashion, the table drive shaft 10 is coupled by a flexible rotatable shaft 32 to the computer 30. The computer receives the angular displacements of the shafts 8 and 10 as input signals and mechanically translates such displacements to a corresponding unidirectional output angular displacement conveyed through an output flexible shaft 34. The flexible shaft 34 is utilized to drive the wire feeding mechanism through a belt and pulley system generally indicated at 36.

By reference to FIGS. 2, 3 and 4, the details of the mechanical analogue computer will be explained. The computer includes a first rotatable input shaft 40 supported by bearings 42 and 44, respectively mounted in the housing 38 and a web 46 internally of the housing 38. The input shaft 40 is connected to the flexible shaft 28 by a conventional shaft coupling 48. The input shaft 40 is provided with a first gear train 50 and a second gear train 52 coupling the input shaft to a first intermediate rotatable shaft 54 rotatably mounted at one end by a bearing 56 mounted in the housing 38 and by another bearing 58 mounted in the web 46. The gear train 50 includes a pair of gears 50' and 50''. The gear 50' is keyed to a hub 60 which is in turn secured by a fastener 62 to the input shaft 40. The gear 50'' is keyed to a hub 64 which is coupled to the first intermediate shaft 54 by an interposed one way clutch 66, which operates to disengage the shaft 54 during clockwise rotation of the gear 50''. In similar fashion the gear train 52 includes a pair of gears 52' and 52'', the gear 52' being keyed to a hub 68 which is in turn secured by a fastener 70 to the input shaft 40. The gear 52'' is keyed to a hub 72 which is coupled to the intermediate shaft 54 through an interposed one way clutch 74 which operates to disengage shaft 54 from the gear 52'' during clockwise rotation thereof. It is noticed however with respect to FIG. 3, that the gear 52' is coupled to the gear 52'' by an interposed idler gear 52'''.

Figure 2:
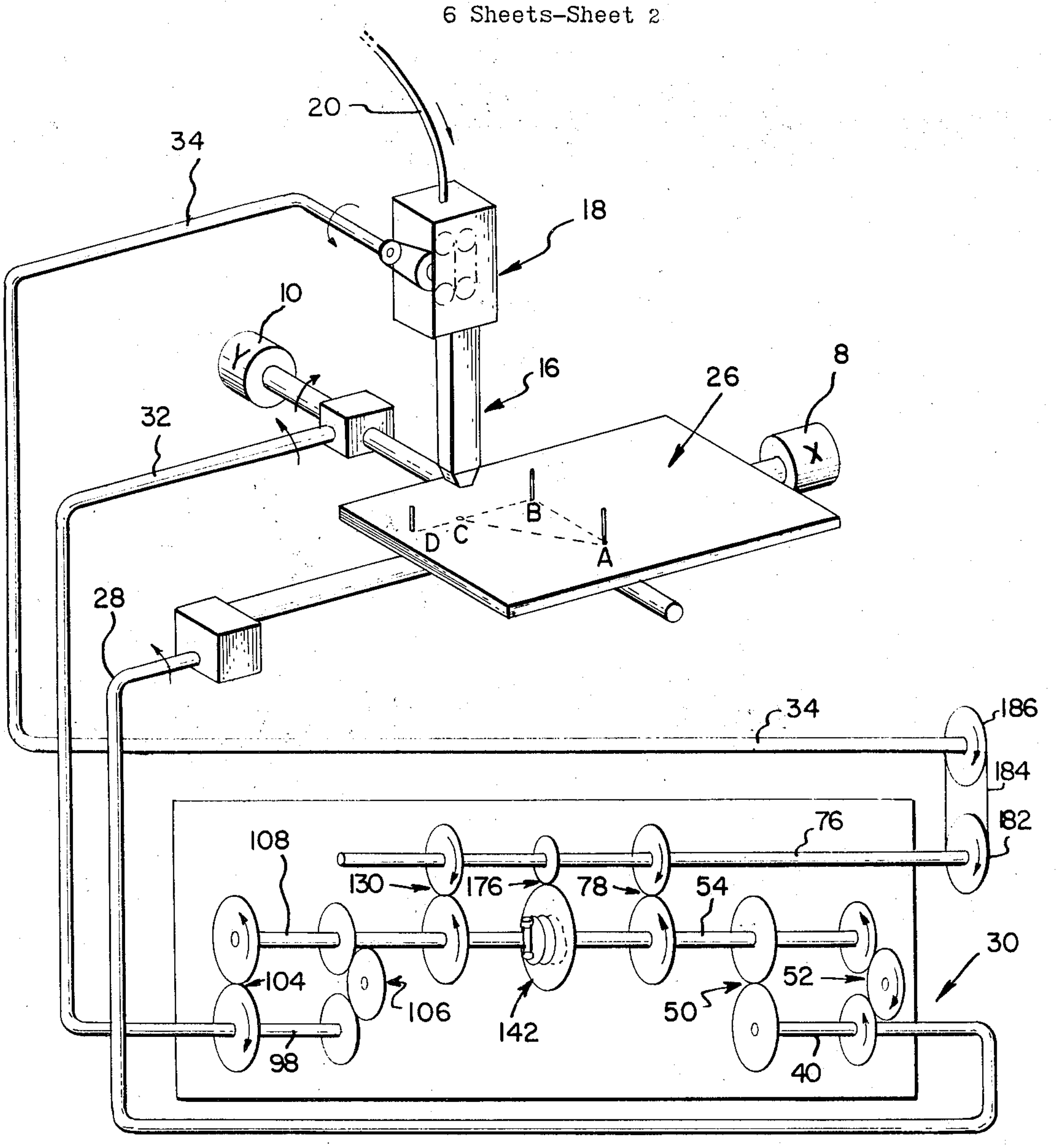
FIG. 2 is a diagrammatic representation of the preferred embodiment as shown in FIG. 1, further illustrating the details of a mechanical analogue computer forming a part of the machine as illustrated in FIG. 1.
Figure 3:
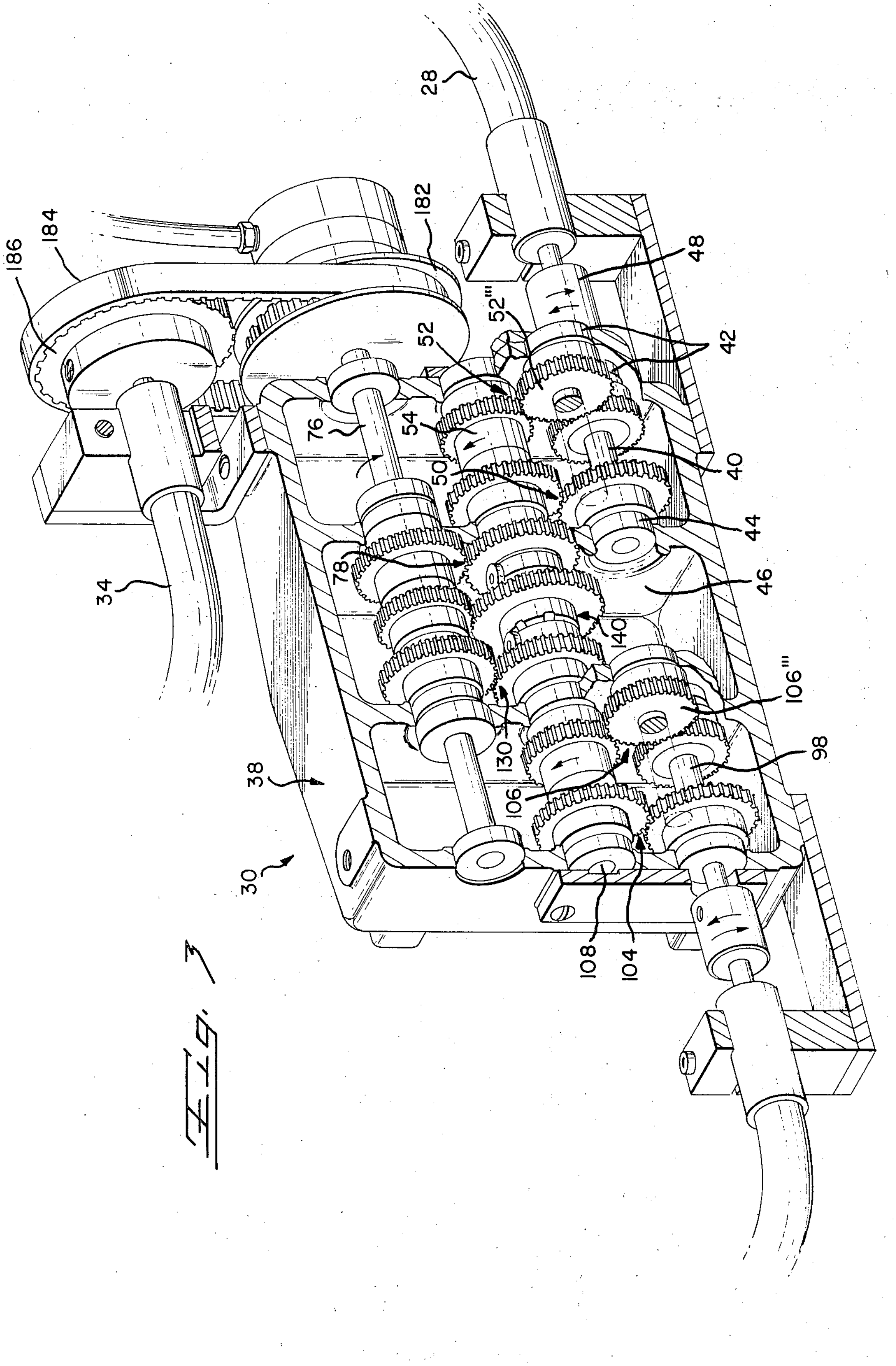
FIG. 3 is a perspective with parts in section of the mechanical analogue computer illustrated diagrammatically in FIG. 2.
Figure 4:
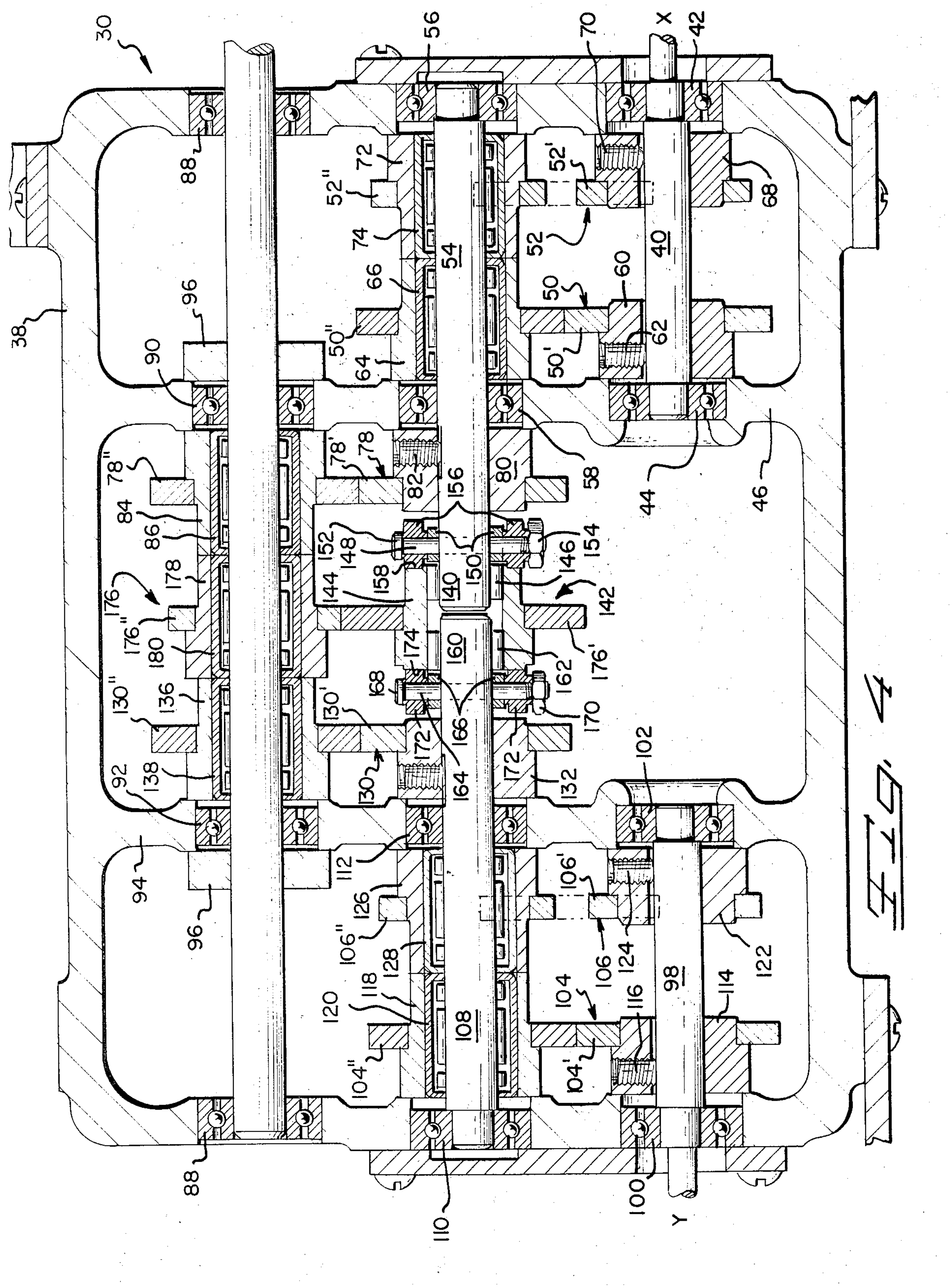
FIG. 4 is an enlarged elevation in section of the preferred embodiment of the mechanical analogue computer illustrated in FIG. 3.

By reference yet to FIGS. 2, 3 and 4, the intermediate shaft 54 is coupled to an output shaft 76 by a gear train 78. More particularly, the gear train 78 includes a pair of gears 78', 78'' directly coupled to each other. The gear 78' is keyed to a hub 80 which is secured by a threaded fastener 82 to the shaft 54. The gear 78'' is keyed to a hub 84 which in turn is coupled to the ouput shaft 76 through an interposed conventional one way clutch 86. It is more particularly shown in FIG. 4, the output shaft 76 is mounted on bearings 88, 90 and 92 respectively mounted in the housing, the web 46 and another web 94 interiorly of the housing 38. In addition, the output shaft 76 has mounted thereon a pair of thrust bearings 96 mounted outboard of the interposed webs 94 and 46 in order to retain the shaft 76 in desired position within the housing 38.

With reference again made to FIGS. 2 through 4, the computer 30 is further provided with a second input shaft 98 mounted for rotation on bearings 100 and 102, respectively mounted in the housing 38 and the web 94. The input shaft 98 is coupled to a first gear train 104 and a second gear train 106 to a second intermediate shaft 108 mounted for rotation by a pair of bearings 110, and 112, respectively mounted in the housing 38 and the web 94. The gear train 104 includes a pair of gears 104' and 104'' directly coupled to each other. The gear 104' is coupled to a hub 114 in turn secured by fastener 116 to the shaft 98. The gear 104'' is keyed to a hub 118, in turn coupled to the intermediate shaft 108 by an interposed one way clutch 120 which operates to disengage the shaft 108 upon clockwise rotation of the gear 104''. The gear train 106 includes a pair of gears 106' and 106'' coupled to each other through an idler gear 106''' as shown in FIG. 3. The gear 106' is keyed to a hub 122 which in turn is secured by a fastener 124 to the input shaft 98. The gear 106'' is keyed to a hub 126 which in turn is coupled to the intermediate shaft 108 through an interposed one way clutch 128 which operates to disengage the shaft 108 from the gear 106'' upon clockwise rotation thereof. The intermediate shaft 108 is coupled to the output shaft 76 through a gear train generally indicated at 130. The gear train 130 includes a pair of gears 130' and 130'' directly coupled to each other. The gear 130' is keyed to a hub 132 which in turn is secured by fastener 134 to the intermediate shaft 108. The gear 130'' is keyed on a hub 136 which in turn is coupled to the output shaft 76 by an interposed one way clutch 138.

Thus far, the computer according to the present invention includes a pair of input shafts 40 and 98, each of which is coupled by a pair of gear trains to an intermediate shaft 54 or 108. The intermediate shaft is then coupled to the single output shaft 76 such that either of the shafts 54 or 108 will drive the output shaft 76 in a single direction of angular displacement as will be explained hereinafter.

With reference to FIG. 4, taken in conjunction with FIGS. 3 and 5, additional structure will be explained in detail for driving the output shaft 76 upon rotation of both shafts 54 and 108. The shaft 54 includes an end portion 140 extending through the hub 80 and terminated to a differential clutch 142. More particularly, the shaft end portion 140 is received internally of an enlarged hub 144 of the differential clutch. The shaft end portion 140 is mounted on cylindrical roller bearings 146 for free rotation internally of the hub 144. The shaft end portion 140 is further provided with a transverse shaft 148 retained in place by a pair of pillow blocks 150 located on either side of the shaft end portion 140. The shaft is provided with an enlarged head 152 at one end thereof and an enlarged threaded nut connection 154 at the other end thereof. The shaft 148 is provided thereon with a pair of friction rollers 156 each of which engages on an end 158 of the differential clutch 142. In similar fashion, the shaft 108 has an end portion 160 mounted in cylindrical roller bearings 162 received internally of the hub 144. The shaft end portion 160 has attached thereto a transverse shaft 164 affixed by pillow blocks 166 on opposed sides of the shaft portion 160. The shaft 154 has an enlarged end 168 and a enlarged threaded nut connection 170 at the other end. The enlarged end retains thereon a pair of friction rollers 172 which engage against an end 174 of the differential clutch 142. When both shafts 108 and 54 are turning, their respective rollers 172 and 156 will cooperate to forcibly engage on the opposed end portions 174 and 158 of the differential clutch 142. Upon rotation of both the shafts 108 and 54 the rollers 172 and 156 will forcibly drive and will rotate the hub 144 of the differential clutch. The differential clutch thereby couples the shafts 108 and 54 to a gear train 176, including an enlarged gear 176' which is keyed to the hub 144 and which operatively mates with a relatively small gear 176'' keyed to a hub 178. The hub 178 is operatively coupled over the output shaft 76 by an interposed one way clutch 180. The output shaft 76 is operatively connected to a belt and pulley system 182, including pulley 184 which in turn drives a belt 186 over a second companion pulley 188. The output of the pulley 188 is supplied to the flexible shaft 34.

In operation of the computer, reference will be made to FIG. 2. As shown diagrammatically, the substrate 26 includes a plurality of spaced locations at which respective discrete wire lengths are to be bridged across and connected by the conventional wire connecting mechanism 16. As shown the spaced locations A, B, C and D are defined by upstanding post-type terminals. However such locations may also be defined by apertures in the substrate within which the wire ends may be inserted and thereby connected to the substrate.

Suppose it is desired to bridge across and connect a discrete length of wire to points A and B. Beginning initially at location A, the wire connecting mechanism 16 is actuated in the well known manner to connect one end of the discrete length of wire at location A. Since displacement from location A to location B occurs only along the axis of the shaft 10, clockwise angular displacement of the shaft 10 will cause the substrate to be displaced in order to position point B adjacent the wire connecting mechanism 16. The clockwise angular displacement of the shaft 10 is transmitted over the flexible shaft 32 thereby producing a corresponding clockwise rotation of the shaft 98. The clockwise displacement of the input shaft 98 is transmitted over the gear train 104 to produce a corresponding counterclockwise angular displacement of the intermediate shaft 108. During clockwise rotation of the input shaft 98, the gear train 106 would ordinarily transmit a corresponding clockwise rotation to the shaft 108. However, this is prevented since the clutch 128 uncouples the gear 106' of the gear train 106 from the input shaft 108 during clockwise rotation of the gear 106' thereof. The counterclockwise angular displacement of the intermediate shaft 108 is transmitted through the gear train 130 to the output shaft 76. Since only the intermediate shaft 108 undergoes angular displacement, there was a differential rotation between the shaft 108 and the shaft 54. Such differential angular displacement or rotation is sensed by the differential clutch 142 which selectively decouples itself from the shafts 108 and 54, thereby uncoupling the gear train 176 from both the shafts 108 and 54. In addition, the one way clutch 180 operates to uncouple the gear 176'' from the output shaft 76. The displacement of the shaft 76 is clockwise as shown in FIG. 2 and is transmitted over the pulleys 182 and 186 to produce a corresponding angular displacement of the flexible shaft 34. The flexible shaft 34 is then utilized to drive or otherwise advance the wire feeding mechanism 18, thereby causing a discrete length of wire to be unreeled and withdrawn from the continuous length of wire supplied over the tube 220. Additionally, the length of the selected discrete length of wire corresponds to the distance between locations A and B of the substrate 26. Thus when the substrate 26 undergoes displacement from location A to location B, the corresponding angular displacement of the shaft 10 is converted by the computer 30 to drive the wire feeding mechanism and also to produce a corresponding discrete length of wire sufficient to bridge across the distance between locations A and B. Thus displacement of the substrate 26 produces a corresponding discrete length of wire to be supplied from the wire feeding mechanism 18 to the wire connecting mechanism 16. When location B is positioned adjacent the connecting mechanism 16, the mechanism is then actuated in a well known manner to sever the discrete length of wire from the continuous wire length and to connect the end of the discrete length of wire at location B.

A discrete length of wire may be bridged across location A and B by initially beginning at location B and displacing the substrate to location A, a reverse operation to that described. Accordingly, such displacement is produced by a counterclockwise angular displacement of the shaft 10 which is transmitted over the shaft 32 to produce a corresponding counterclockwise angular displacement of the input shaft 98. Such displacement is transmitted through the gear train 106 to produce a corresponding counterclockwise operation of the intermediate shaft 108. Since the angular displacement of shaft 98 is counterclockwise, the gear train 104 will ordinarily produce a clockwise rotation of the gear 104'' and the intermediate shaft 108. However, upon clockwise rotation of the gear 104'', the one way clutch 120 will operate to uncouple the shaft from the gear 104''. Accordingly, the intermediate shaft 108 is always displaced counterclockwise as shown in FIG. 2 despite either clockwise or counterclockwise angular displacement of the shaft 10. The unidirectional angular displacement of the intermediate shaft 108 thus produces a corresponding unidirectional output of the shaft 76 despite reversible displacement of the substrate 26 and the shaft 10.

As shown in FIG. 2, another operation of the computer 30 will be described in detail. Suppose it is desired to bridge a discrete length of wire from locations B to D of the substrate. Beginning at point B, the wire connecting mechanism 16 is actuated to connect one end of the discrete length of wire at location B. The substrate 26 is displaced to position location D adjacent the wire connecting mechanism 16 which mechanism is again actuated to connect the other end of the discrete length of wire at location D. Since displacement from location B to location D occurs entirely along the axis of the shaft 8, only shaft 8 will undergo angular displacement counterclockwise as shown in FIG. 2. Such counterclockwise angular displacement is transmitted over the flexible shaft 22 to produce a corresponding counterclockwise angular displacement of the input shaft 40. Such displacement is transmitted over the gear train 52 to produce a corresponding counterclockwise angular displacement of the intermediate shaft 54. Ordinarily, the shaft 54 through the gear trail 50 would produce a clockwise rotation of the input shaft 54. However, the gear 50'' is uncoupled from the intermediate shaft 54 by operation of the one way clutch 66 during clockwise rotation of the gear 50''. As shown in FIG. 2, the counterclockwise angular displacement of the intermediate shaft 54 is transmitted through the gear train 78 to produce a corresponding clockwise angular displacement of the output shaft 76. The one way clutch 180 operates to uncouple the gear 176'' from the shaft 76. Since only the intermediate shaft 54 is undergoing angular displacement, a differential comparative angular displacement occurs between the shafts 54 and 108. Such differential angular displacement is sensed by the differential clutch 142 which operates, as will be explained more in detail hereinafter, to uncouple itself from both the shafts 54 and 108 and thereby uncouple the gear train 176 and the output shaft 76 from the shafts 54 and 108. The angular displacement of the output shaft 76 is transmitted over the flexible shaft 34 to drive the wire feeding mechanism 18, thereby withdrawing a discrete length of wire from the continuous length of wire supplied over the tube 20. The selected discrete length of wire is supplied to the wire connecting mechanism allowing the mechanism 16 to bridge the discrete length of wire between and connect it at the locations B and D of the substrate 26. The length of discrete length of wire supplied by the feeding mechanism 18 is substantially the same length as the displacement of the substrate 26 between the locations B and D. Thus a displacement of the substrate and the corresponding angular displacement of the shaft 8 is converted by the computer 30 to a corresponding advance of the wire feeding mechanism 18 to produce a discrete length of wire sufficient to bridge the distance between points B and D of the substrate 26.

The operation may be reversed, by beginning at point D and displacing the substrate 26 to position point B under the wire connecting mechanism 16. In the reverse operation, the shaft 8 will undergo an angular displacement clockwise as shown in FIG. 2. Such angular displacement is transmitted over the shaft 28 to produce a corresponding clockwise angular displacement of the input shaft 40. Such displacement is transmitted over the gear train 50 to produce a corresponding counterclockwise angular displacement of the intermediate shaft 54. Ordinarily the clockwise displacement of the input shaft would also be transmitted over the gear train 52 to produce a corresponding clockwise angular displacement of the shaft 54. However, the clutch 72 operates to uncouple the gear 52'' from the shaft 54 during clockwise rotation of the gear 52''.

Accordingly, either clockwise or counterclockwise angular displacement of the shaft 8 will produce a corresponding unidirectional counterclockwise angular displacement of the intermediate shaft 54. Accordingly, a unidirectional output of the shaft 76 is created which supplies a discrete length of wire to the connecting mechanism, which length corresponds to the displacement of the substrate 26 along the axis of the shaft 8.

Suppose it is desired to connect a length of wire generally diagonally from location D to location A. According to a typical machine operating in the prior art, the discrete length of wire would ordinarily be first bridged between points D and B and then between points B and A. However, it is recognized that bridging of the wire can be accomplished within a short period of time and with a lesser amount of wire if the wire could be bridged directly diagonally from points D to A, or at least from point D to point C and then diagonally from points D to point A as shown in FIG. 2. Thus, beginning at location D, the wire connecting mechanism 16 is actuated in the well known manner to connect one end of a discrete length of wire at location D. The substrate is initially displaced along the path $\overrightarrow{DC}$ and then directly diagonally along the path $\overrightarrow{CA}$, thereby positioning location A adjacent the wire connecting mechanism 16 which is again actuated in the well known manner to connect the other end of the discrete length of wire at location A. More specifically, beginning initially at location D, the shaft 8 undergoes a clockwise rotation as shown in FIG. 2. Such rotation is transmitted through the input shaft 40, the gear train 50, the gear train 78 and the output shaft 76 as previously described. Since only the shaft 8 undergoes rotation or angular displacement, the differential clutch 142 uncouples itself from the shafts 54 and 108 as previously described. However, when the substrate 26 is located with location C vertically under the wire connecting mechanism 16, both the shaft 8 and the shaft 10 will undergo simultaneous angular displacement, thereby displacing the substrate 26 diagonally along the path $\overrightarrow{CA}$. More specifically, the shaft 8 will continue its clockwise angular displacement as described to displace the substrate 26 the equivalent displacement of the path $\overrightarrow{CB}$. Simultaneously, the shaft 10 will undergo counterclockwise angular displacement to produce displacement of the substrate 26 the equivalent distance of the path $\overrightarrow{BA}$. The resultant displacement of the substrate will be diagonally along the path $\overrightarrow{CA}$ which displacement will be equal to the vector sum of the displacements along both the axes of the shafts 8 and 10. During simultaneous angular displacements of the shafts 8 and 10, both the intermediate shafts 108 and 54 will undergo corresponding unidirectional counterclockwise angular displacements as shown in FIG. 2. With all the gear ratios between the mating gears of the gear trains 52, 50, 104 and 106 being 1:1, the angular displacements of the shafts 54 and 108 will be equal. With no comparative differential displacement between the shafts, the differential clutch 142 will operate, as will be explained hereinafter, to couple itself to both the shafts 54 and 108, transmitting the angular displacements thereof through the gear train 176 to produce a corresponding clockwise angular displacement of the shaft 76. The gear trains 130 and 78 each are selected with a gear ratio of 1:1 between mating gears. However the differential clutch 142 is selected with a gear ratio of 1.414:1 between the gear 176' and the gear 176''. Thus upon coupling of the differential clutch 142 to the shafts 54 and 108 both undergoing angular displacement, the gear 176'' will be driven faster by the gear train 176 than the gear trains 130 and 78, respectively. Thus a differential angular displacement will occur between the output shaft 76 and both the gears 130'' and 78''. Upon the occurrence of such differential angular displacement, the one way clutches 138 and 86 will operate to disengage or uncouple the gears 130'' and 78'' from the shaft 76. Thus, the angular displacement of the output shaft 76 produced by the gear 176'' will be greater by the ratio of 1.414:1 than the displacements of either of the shafts 54 and 108.

In summary, as shown in FIG. 2, the simultaneous angular displacement of both shafts 8 and 10 causes a corresponding displacement of the substrate diagonally with respect to the orthogonal axes of the shafts 8 and 10, from location C to location A. The wire feeding mechanism 18 will be driven by the output shaft 76 to select and supply a discrete length of wire equivalent to the path length $\overrightarrow{CA}$, thus supplying a discrete length of wire equivalent to the vector sum of the combined path lengths $\overrightarrow{CB}$ and $\overrightarrow{BA}$. As shown, the diagonal displacement of the substrate 26 is 45° with respect to the orthogonal axes of the shafts 8 and 10. In order to supply a corresponding required discrete length of wire to bridge along the path $\overrightarrow{CA}$, the gear ratios of the gear train 176 must be 1.414:1. It is understood that any other desired gear ratio may be selected. For example, if the path $\overrightarrow{CA}$ were to lie at an angle of 30° with respect to the orthogonal axis of the shaft 8, the gear ratio of the gear train 176 would than be 2:1, while the gear ratio of the gear trains 50 and 52 must be selected to produce an angular displacement of shaft 54 with a ratio of 1.732:1 by comparison with the angular displacement of the input shaft 40. The gear ratios of the gear trains 104 and 106 may then be retained at ratios of 1:1.

Figure 6:
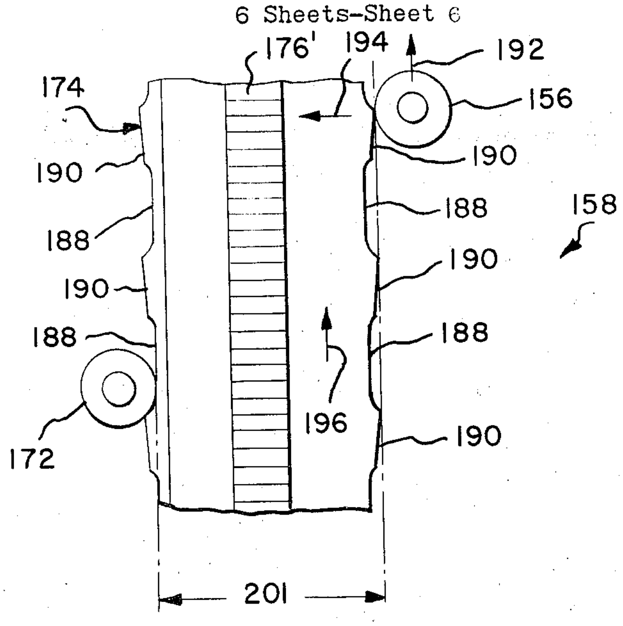
FIGS. 6 and 7 are fragmentary diagrammatic profiles of a differential clutch utilized in the mechanical analogue computer illustrated in FIGS. 2, 3 and 4.
Figure 7:
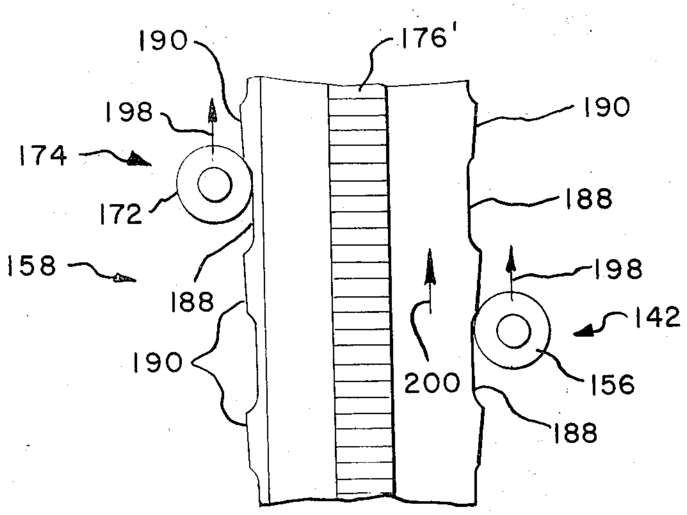

With reference to FIGS. 6 and 7, operation of the differential clutch 142 will be described in detail. The figures illustrate the profiles of the differential clutch ends 158 and 174. As shown, the profiles include spaced notch portions 188 and 188' separated by inclined projecting boss portions 190 and 190'. The differential clutch is designed to uncouple itself from the shafts 54 and 108 upon experiencing differential comparative angular displacement between the shafts 54 and 108. For example, if the shaft 54 is undergoing counterclockwise angular displacement, while the shaft 108 is stationary, each roller 156 of the shaft 54 will traverse, in the direction indicated by the arrow 192, over the inclined surfaces of a boss 190. Such action forcibly laterally shifts the differential clutch 142 in the direction of the arrow 194. With reference to both figures 4 and 6, such lateral shift is permitted since the clutch hub 144 is mounted on cylindrical roller bearings 146 and 162 over which the hub is shiftable laterally. Such lateral shift allows the rollers 156 to traverse freely over the hub end surface 158. Accordingly, the hub is operatively uncoupled from the rollers 156 and the shaft 54. In addition, since the shaft 108 is stationary, the corresponding rollers 172 thereof are also stationary. Upon the lateral shifting of the differential clutch, the rollers 172 will each be received within a corresponding notch 188'. Clearance space is provided by the notches 188' to permit receipt of a roller 172 therein and to allow lateral shift of the hub. If the hub is laterally shifted while the rollers 172 are engaged against corresponding boss portions 190', there is insufficient clearance for the hub to effect the shift. It is then required that the rollers 156 engage and move the hub slightly in the direction of the arrow 196 causing the hub boss portion 190' to transverse past the roller 172, whereupon the roller 172 will be received within a notch portion 188' immediately adjacent the boss portion 190'. Such action accordingly allows lateral shifting and uncoupling of the hub 142 from the rollers 172 and the shaft 108. Thus receipt of the rollers 172 within the notch portions 188' permit lateral shifting of the hub allowing it to be uncoupled also from the rollers 156 and the shaft 54.

As shown in FIG. 7, when both rollers 172 and 156 are being driven in the direction of the arrows 198, each will be received within a corresponding notch portion 188 and 188'. With the rollers in the notch portions, they will be driven in the direction shown at 198 and will be displaced within the notch portions until they engage against the adjacent projecting boss portions 190 and 190'. Continued displacement of the rollers forcibly impels the differential clutch in the direction shown by the arrow 200. Thus upon angular displacement of both the shafts 108 and 54, the differential clutch will become operatively coupled to the rollers 172 and 156 in order to transmit simultaneous angular displacement of the shafts 54 and 108, through the gear train 176 to the output shaft 76.

As shown in FIG. 6, it may be that one of the rollers, such as the roller 156, will be initially engaged on a land portion 190. However, the hub is then laterally shifted and thereby operatively uncoupled from the shafts until the roller 156 is displaced in the direction of the arrow 192 until it engages within a notch portion 188. Thus, with both rollers 172 and 156 received in corresponding notch portions 188 and 188', both rollers will be displaced within the notch portions until they engage against land portions 190 and 190' of the hub and positively drive the hub as described.

As shown in FIG. 6, the spacing 201 between the rollers 172 and 156 are of a fixed dimension, smaller than the width of the hub 142 as measured across opposed boss portions 190 and 190'. This insures that at no time will both rollers 156 and 172 be engaged on opposed boss portions 190 and 190'. If during operation, the roller 156 comes to rest on a boss portion 190 as shown in FIG. 6, and it is desired to angularly displace only shaft 108, such displacement of the shaft will displace the roller 172 internally of the notch portion 188' in the direction of the arrow 196 until it engages against an adjacent protruding boss portion 190'. Continued displacement of the roller 172 against the boss portion will forcibly drive the hub 158 slightly, in the direction of the arrow 196, until the roller 156 is disengaged from the land portion 190 and registers within the immediately adjacent notch portion 188. Continued displacement of the roller 172 will also forcibly laterally shift the hub 158 in a direction opposite to that of the arrow 194 allowing free relative displacement of the roller 172 over the hub.

Figure 5:
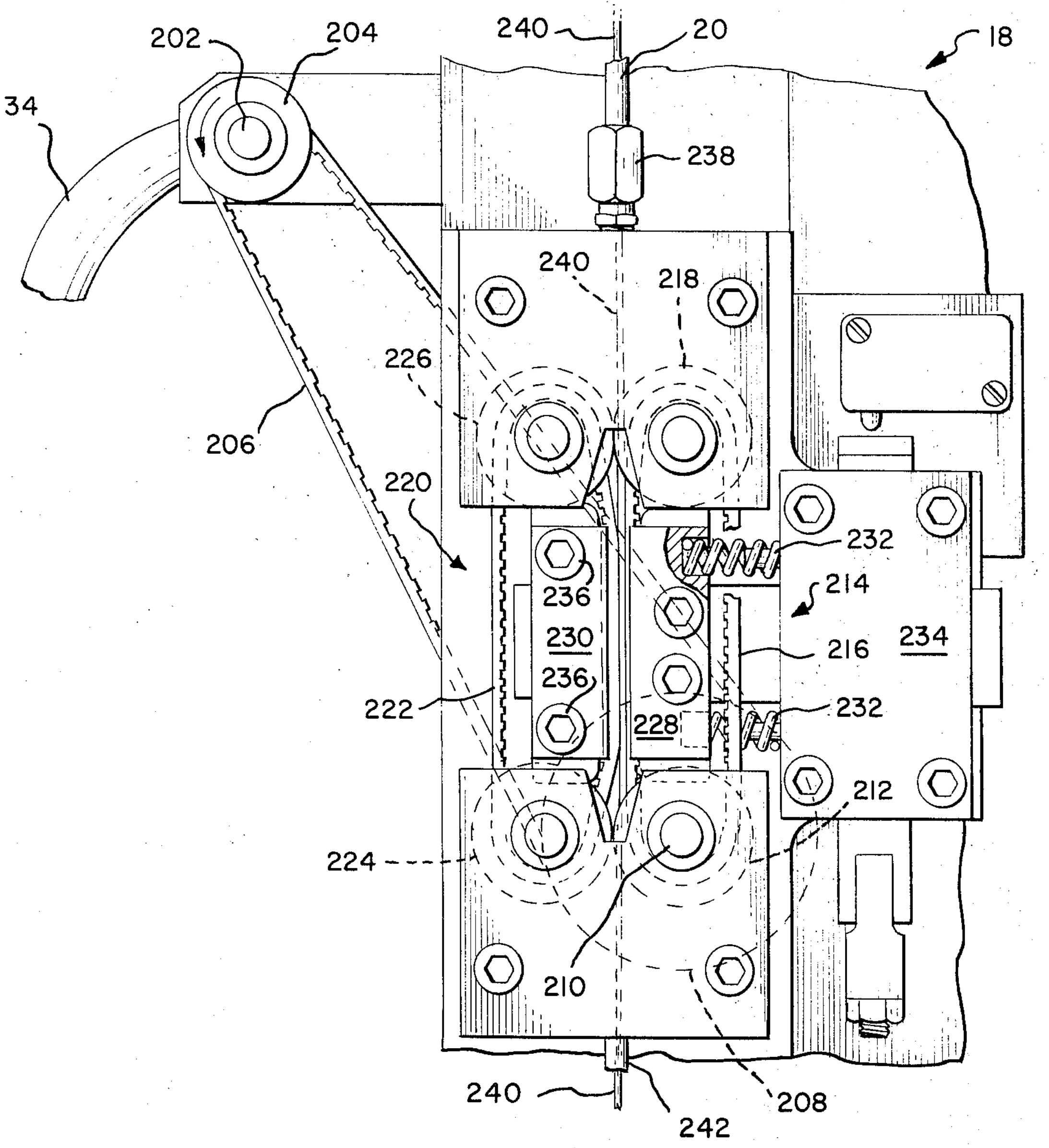
FIG. 5 is a fragmentary elevation with parts broken away and with parts in section illustrating the details of a wire feeding mechanism forming a part of the machine illustrated in FIG. 1.

With reference to FIG. 5, taken in conjunction with FIG. 3, the wire feeding mechanism 18 will be described in detail. As shown in the figures, the output of the computer output shaft 76 is transmitted through the flexible shaft 34 which drives a shaft 202 over which is mounted a pulley 204. The pulley 204 is operatively connected by a belt 206 to an enlarged drive wheel 208 mounted on the shaft 210. Also mounted to the shaft 210 is a relatively smaller diameter pulley 212 forming part of a belt drive mechanism generally illustrated at 214. Accordingly a belt 214 is received over the pulley 212 and a companion pulley 218. A similar belt drive is illustrated generally at 220 and includes a belt 222 received over a pair of spaced companion pulleys 224 and 226. Each of the belt drives has a platen 228 and 230 respectively associated therewith. The platen 228 is spring loaded, for example, by coil springs 232 which are partially compressed between a respective platen and a housing 234 of the wire feeding mechanism 18. The platen 230 is fixedly secured by fasteners 236 to the housing 234. To complete the assembly, the wire feeding tube 20 is secured by a coupling 238 to the housing 234. A continuous length of wire 240 is supplied through the tube 20 and is received between the belts 222 and 216, the platens 228 and 230 cooperating to compress on opposed sides of the continuous length of wire 240 such that upon driving the driving pulley 208 by the flexible shaft 34, linear displacement of the cooperating belts 222 and 216 will be equal substantially to the linear coaxial or diagonal displacement of the substrate with respect to the orthogonal axes of the drive shafts 8 and 10. For example, either of the belts 216 or 222 may be grooved, to receive the continuous length of wire therein and to straighten the wire as it is received between the belts, in order to insure that a required discrete length of wire is linearly passed between the belts and supplied over the output feed tube 242 to the wire connecting mechanism 16.

Although a preferred embodiment of the present invention has been shown and described in detail, it should be understood that other embodiments and modifications of the present invention are to be covered by the scope and spirit of the appended claims.

What is claimed is:

1. An analogue computer, comprising: first sensing means for sensing both clockwise and counterclockwise angular displacement about a first axis of rotation, converting means respectively coupled to and responsive to said first sensing means for converting both clockwise and counterclockwise angular displacement sensed by said sensing means into a first unidirectional angular displacement, and second sensing means for sensing both clockwise and counterclockwise angular displacement about a second axis of rotation, said converting means being operatively coupled to and responsive to said second sensing means for converting both clockwise and counterclockwise angular displacement sensed by said second sensing means into a second unidirectional angular displacement, said converting means being operatively coupled to and responsive to both said first sensing means and said second sensing means for converting simultaneous clockwise and counterclockwise angular displacements sensed by both said first sensing means and said second sensing means into a third unidirectional angular displacement, said computer thereby producing a unidirectional angular displacement corresponding to the sensed angular displacements either clockwise or counterclockwise about both said first and said second axes.

2. The structure as recited in claim 1, wherein, said converting means produces said first unidirectional displacement upon the sensing of clockwise or counterclockwise angular displacement by said first sensing means and upon the sensing of zero clockwise and also zero counterclockwise angular displacement by said second sensing means.

3. The structure as recited in claim 1, wherein, said connecting means produces said second unidirectional displacement upon the sensing of clockwise or counterclockwise angular displacement by said second sensing means and upon the sensing of zero clockwise and also zero counterclockwise angular displacement by said first sensing means.

4. The structure as recited in claim 1, wherein, said converting means produces said third unidirectional displacement when neither said first sensing means nor said second sensing means senses zero clockwise and also zero counterclockwise angular displacement.

5. The structure as recited in claim 1, wherein, said converting means produces said first unidirectional displacement upon the sensing of clockwise or counterclockwise angular displacement by said first sensing means and upon the sensing of said zero clockwise and also zero counterclockwise angular displacement by said second sensing means, said converting means produces said second unidirectional displacement upon the sensing of said clockwise or counterclockwise angular displacement by said second sensing means and upon the sensing of zero clockwise and also zero counterclockwise angular displacement by said first sensing means, and said converting means produces said third unidirectional displacement when neither said first sensing means nor said second sensing means senses zero clockwise and also zero counterclockwise angular displacement.

6. The structure as recited in claim 1, wherein, said first sensing means includes a first rotatable shaft, a second rotatable shaft, a first intermediate shaft, a second intermediate shaft, an output shaft, first gear train means operatively connecting said first rotatable shaft with said first intermediate shaft for unidirectional angular displacement of said first intermediate shaft in response to either clockwise or counterclockwise angular displacement of said first rotatable shaft, second gear train means operatively connecting said second rotatable shaft with said second intermediate shaft for unidirectional angular displacement of said second intermediate shaft in response to either clockwise or counterclockwise angular displacement of said second input shaft, third gear train means operatively connecting said first and second intermediate shafts to said output shaft for transferring angular displacement of said first and second intermediate shafts to said output shaft, a differential clutch operatively connecting said first and second intermediate shafts during simultaneous rotation thereof to said output shaft, said differential clutch being operatively disengaged from both said first and second intermediate shafts upon a comparative differential angular displacement between the angular displacement of said first intermediate shaft, and the angular displacement of said second intermediate shaft.

7. A mechanical analogue computer for producing a linear resultant displacement which is a vector sum of two sensed linear displacements along respective orthogonal axes, comprising:

a first drive mechanism for linearly displacing an object along a first orthogonal axis, a second drive mechanism for linearly displacing an object along a second orthogonal axis, a rotatable element connected to said first drive means and being angularly displaced an amount in proportion to the linear displacement of said object along said first orthogonal axis, a second rotatable element connected to said second drive mechanism and being angularly displaced an amount in proportion to the linear displacement of said object along said second orthogonal axis, a first gear train and a second gear train coupled together by a differential clutch, a third gear train coupling said differential clutch to an output shaft, said differential clutch being responsive to simultaneous angular displacements of said first and second gear trains to produce a corresponding angular displacement of said output shaft, and said third gear train being selected with a gear ratio which is the square root of the sum of the respective square roots of the gear ratios of said first and said second gear trains.

* * * * *